United States Patent [19]
Park et al.

[11] Patent Number: 5,361,790
[45] Date of Patent: Nov. 8, 1994

[54] APPARATUS AND METHOD FOR CLEANING A FILTER ASSEMBLY

[75] Inventors: Jong-Mun Park; Chan-Sik Jeong; Uk-Hwan Oh; Taek-Jong Yu, all of Suwon, Rep. of Korea

[73] Assignee: SKC Limited, Suwon, Rep. of Korea

[21] Appl. No.: 31,692

[22] Filed: Mar. 15, 1993

[30] Foreign Application Priority Data

Mar. 14, 1992 [KR] Rep. of Korea .................... 92-4205

[51] Int. Cl.$^5$ ............................................ B08B 3/02
[52] U.S. Cl. .................................... 134/95.3; 134/152; 134/170; 134/105; 134/147; 134/111; 134/188
[58] Field of Search ................ 134/95.1, 95.2, 98.1, 134/99.1, 105, 169 R, 184, 180, 166 R, 170, 171, 152, 191, 92, 147, 165

[56] References Cited

U.S. PATENT DOCUMENTS

| | | | |
|---|---|---|---|
| 1,933,980 | 11/1933 | Hornbuckle et al. | 68/189 |
| 2,558,628 | 6/1951 | Redin | 134/99.1 |
| 2,577,727 | 12/1951 | Abbott | 68/189 |
| 2,651,311 | 9/1953 | Rule | 134/191 X |
| 2,967,120 | 1/1961 | Chaney | 134/99.1 X |
| 3,620,234 | 11/1971 | Everroad | 68/189 |
| 3,760,614 | 9/1973 | Bergnoltz | 68/189 |
| 4,032,292 | 6/1977 | Jones | 68/189 |
| 4,919,161 | 4/1990 | Schmidt | 134/188 |

FOREIGN PATENT DOCUMENTS 580749 9/1946 United Kingdom ............... 134/188

*Primary Examiner*—Frankie L. Stinson
*Attorney, Agent, or Firm*—William F. Pinsak

[57] ABSTRACT

Disclosed is an apparatus which has the capability of cleaning a waste or used filter assembly with a broad spectrum of chemical agents in an automated fashion. The cleaning apparatus comprises a cleaner vessel for accommodating the filter assembly to carry out triethylene glycol cleaning, sodium hydroxide cleaning, nitric acid cleaning and water washing in a predetermined cleaning sequence. First to fourth reservoirs communicate with the cleaner vessel through their corresponding pipelines to feed such chemical detergent liquids as triethylene glycol solution, sodium hydroxide solution, nitric acid solution and pure water into the vessel. The detergent liquids will circulate within the cleaning vessel by means of a stream generator, whereby the filter assembly can be cleaned to a higher degree of detergency.

10 Claims, 13 Drawing Sheets

APPARATUS AND METHOD FOR CLEANING A FILTER ASSEMBLY

FIELD OF THE INVENTION

The present invention pertains to an apparatus and method for cleaning a filter assembly with chemical agents to remove contaminants or alien matters stuck thereto.

DESCRIPTION OF THE PRIOR ART

As is well-known in the art, polymeric films used as a video or audio tape may be produced by way of melting solid polymeric material usually referred to as "polymer chips" and then stretching the molten polymer to a desired width and thickness. This holds true for the polymeric yarns that have been extensively employed in the textile industry.

The molten polymer has a tendency to contain various foreign matters or unwanted contaminants whose removal is essential to enhance the quality of the obtained polymeric films. It is the industry's practice to remove or screen the foreign matters present in the molten polymer through the use of a generally cylindrical filter assembly. Such a filter assembly consists of an elongate stem with an axial flow path defined therealong and a plurality of finely perforated disk-like filter elements stacked one above the other along the length of the elongate stem. When the filter assembly is in use, the individual filter elements gradually become clogged by the contaminants over time and sooner or later become no longer usable.

Since the filter elements are extremely expensive, it is more desirable to regenerate the used filter assembly through certain cleaning operation than to simply replace it with a new one. To this end, a great deal of efforts has been made to develop an improved technique of cleaning the used filter assembly in an efficient manner. In a known cleaning method, it is typical to first clean the filter assembly with such chemical agents as triethylene glycol, sodium hydroxide and nitric acid. Subsequently, the chemically cleaned filter assembly is subject to a physical treatment, e.g., ultrasonic cleaning.

To carry out the chemical cleaning process, a used filter assembly is placed into a first cleaning vessel in which triethylene glycol cleaning proceeds for a given period of time. The filter assembly is taken out of the first cleaning vessel and then disassembled into individual filter elements for the subsequent water washing. At the completion of the water washing, the filter elements are re-assembled and transferred to a second cleaning vessel in which sodium hydroxide cleaning is performed. The filter assembly is again broken down into individual filter elements for second water washing. Finally, nitric acid cleaning and third water washing are performed in the same manner as stated above to complete the chemical cleaning process.

The physical cleaning process is needed to remove those alien matters or particles which may remain adhered to the filter elements even after the chemical cleaning process has been over. U.S. Pat. No. 5,151,186 issued to Taek J. Yoo et al on Sep. 29, 1992 discloses a filter cleaning system for ultrasonically removing contaminants from the filter disk without having to resort to the operator's manual operation. The system comprises a turntable for holding the filter disks in a stacked condition, a first ultrasonic cleaner for applying an ultrasonic field to one side of the filter disk, a second ultrasonic cleaner for applying an ultrasonic field to the other side of the filter disk, a water injection cleaner for removing residual contaminants from the ultrasonically cleaned filter disk, a robotic carrier for transporting the filter disk from a particular station to another and a controller for governing the overall operation of the filter cleaning system.

While the prior art physical cleaning process has been efficiently performed by a specially designed cleaning device, such is not the case for the chemical process. In other words, the filter assembly has to be manually transferred from one cleaning vessel to another in order to treat it with mutually uncompatible chemical agents, which manual operation is labor-intensive and time-consuming. Another disadvantage of the prior art chemical cleaning lies in that reaction gases are allowed to freely leak from the cleaning vessel, which leads to an environmental pollution and even to a health hazard. Furthermore, it is very cumbersome and laborious to disassemble the filter assembly each time the water wasting begins.

SUMMARY OF THE INVENTION

Accordingly, it is an object of the invention to provide a filter assembly cleaning apparatus and method that has a capability of efficiently cleaning the filter assembly with chemical agents within a shortened period of time in a sufficiently automated fashion.

Another object of the invention is to provide an apparatus for cleaning the filter assembly which is able to avoid undesirable leakage of corrosive or toxic reaction gases from a cleaning vessel.

A further object of the invention is to provide a filter assembly cleaning method which makes it possible to chemically clean the filter assembly in a single cleaner vessel without having to disassemble the filter assembly.

In one aspect, the present invention resides in an apparatus for use in cleaning a filter assembly with chemical agents, the filter assembly including an elongate stem and porous filter elements stacked one above the other along an axis of the stem, the stem having an axial flow path extending from an end aperture to the individual filter elements, which comprises: a cleaner vessel for accommodating the filter assembly to clean it with a spectrum of chemical detergent liquids in a predetermined cleaning sequence; a plurality of reservoirs each communicating with the cleaner vessel and holding the chemical detergent liquids which are to be fed into the cleaner vessel; a water tank communicating with the cleaner vessel and holding water therein, the water tank coupled to the end aperture of the filter assembly to allow the water to flow through the axial flow path into the cleaner vessel; means for causing the chemical detergent liquids to circulate, as a stream, within the cleaner vessel; and means responsive to the predetermined cleaning sequence for controlling operation of the filter assembly cleaning apparatus.

In another aspect of the invention, there is provide a method for cleaning a filter assembly with chemical agents in a cleaner vessel, the filter assembly including an elongate stem and porous filter elements stacked one above the other along an axis of the stem, the stem having an axial flow path extending from an end aperture to the individual filter elements, comprising the steps of:

(a) placing the filter assembly into the cleaner vessel;

(b) cleaning the filter assembly with triethylene glycol solution at an elevated temperature while circulating the triethylene glycol solution within the cleaner vessel;

(c) upon draining the triethylene glycol solution from the cleaner vessel, feeding water under pressure through the axial flow path of the filter assembly into the vessel to remove residual triethylene glycol solution;

(d) cleaning the filter assembly with sodium hydroxide solution while circulating the sodium hydroxide solution within the cleaner vessel;

(e) upon draining the sodium hydroxide solution from the cleaner vessel, feeding the water under pressure through the axial flow path of the filter assembly into the vessel to remove residual sodium hydroxide solution;

(f) cleaning the filter assembly with nitric acid solution while circulating the nitric acid solution within the cleaner vessel; and (g) upon draining the nitric acid solution from the cleaner vessel, feeding the water under pressure through the axial flow path of the filter assembly into the vessel to remove residual nitric acid solution.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
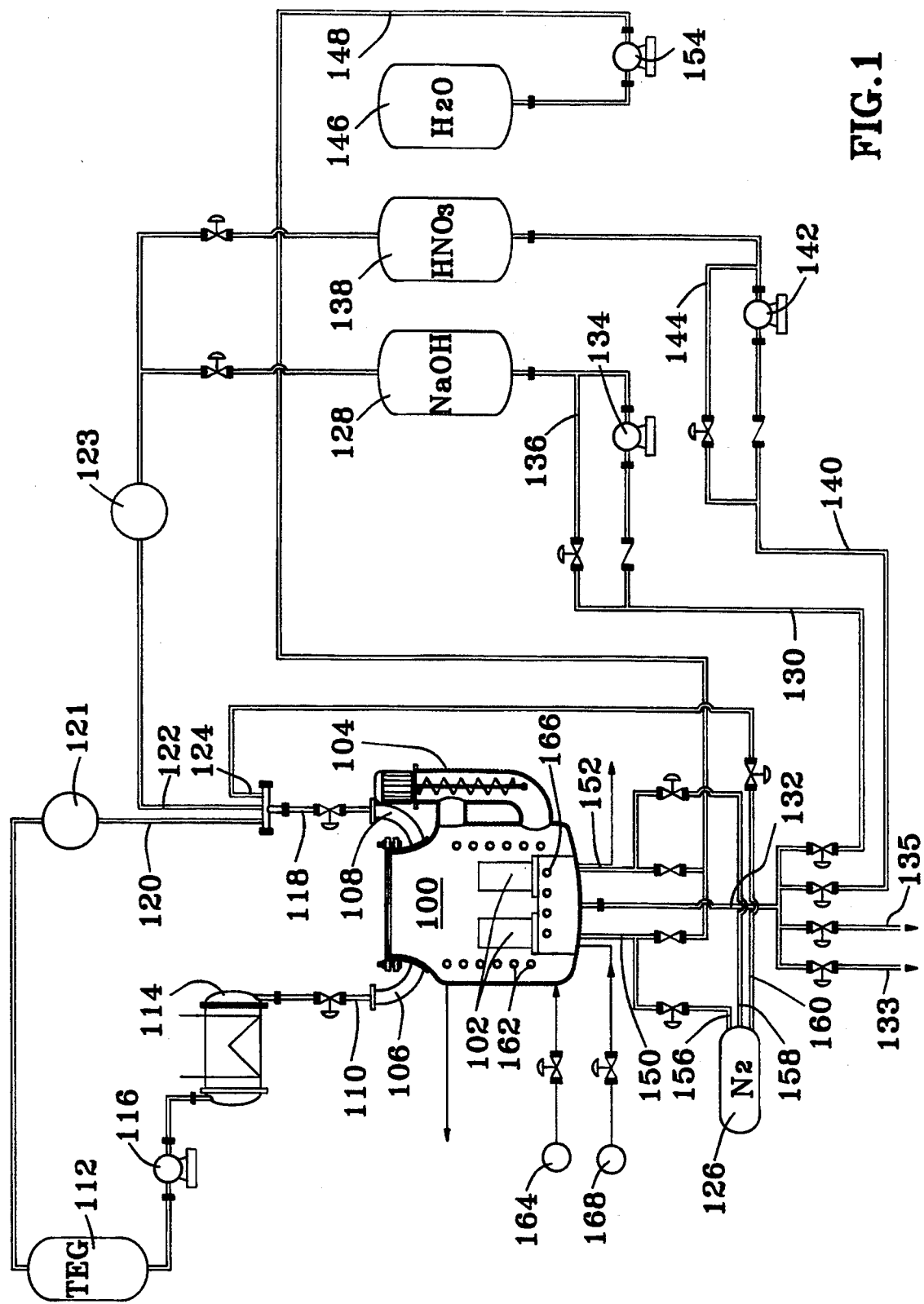
FIG. 1 is a schematic view of the filter assembly cleaning apparatus in accordance with the invention.

Referring to FIG. 1, the cleaning apparatus embodying the instant invention comprises a cleaner vessel 100 receiving therein at least one filter assembly 102 preferably carried by a filter carrying basket set forth below. Since the filter assembly is fairly heavy in weight, a lifting device such as hoist (not shown) has to be employed in placing the filter assembly 102 into the cleaner vessel 100. Suitable chemical detergent liquids, e.g., triethylene glycol, sodium hydroxide and nitric acid are admitted into the cleaner vessel 100 in the stated sequence so as to apply chemical cleaning forces of varying nature to the filter assembly 102. Water is used to wash out residue of the chemical detergent liquids which may be left in the cleaner vessel 100. A stream generator 104 is mounted on the side wall of the cleaner vessel 100 to enable the chemical detergent liquids to circulate, as a vigorous stream, within the cleaner vessel 100. Further details regarding the cleaner vessel 100 will be described below with reference to FIGS. 2 and 3.

Coupled to the right-handed top of the cleaner vessel 100 is a first header 106, with a second header 108 mounted on the left-handed top thereof. It can be seen that a triethylene glycol reservoir 112 communicates with the cleaner vessel 112 through a first pipeline 110 and then the first header 106 mentioned above. The triethylene glycol solution is particularly useful in decomposing solid polymeric material stuck to the filter assembly 102. Midway of the first pipeline 110, there is provided a heat exchanger 114 that serves to preheat the triethylene glycol solution up to a temperature of, e.g., 230° C., as it is being fed into the cleaner vessel 100. A fluid pump 116 may be used in drawing the triethylene glycol solution out of the reservoir 112 to deliver it to the cleaner vessel 100 via the heat exchanger 114. The triethylene glycol solution so supplied will be converted to a vigorous circulating stream by means of the stream generator 104, which stream helps accelerate decomposition of the solid polymer. At the termination of the cleaning operation, the triethylene glycol solution is drained to the outside through a central conduit 132 and a first drainpipe 133. Extending from the second header 108 is a second pipeline 118 to which first to third branch lines 120, 122 and 124 are connected in parallel relationship with one another. The first branch line 120 functions to release therethrough those gases created in the process of triethylene glycol cleaning. The released gases may be liquefied in a condenser 121 before they are returned to the reservoir 112. Likewise, the second branch line 122 is designed to release therethrough those gases emitted from the sodium hydroxide solution or the nitric acid solution, which gases, in turn, will be liquefied by a condenser 123 prior to their returning to the reservoir 128 or 138. The third branch line 124 is used for the purpose of forcing nitrogen gas under pressure from a nitrogen tank 126 into the cleaner vessel 100, thereby ensuring that the chemical detergent liquids may be drained to the outside in a speedy way.

Referring still to FIG. 1, a sodium hydroxide solution reservoir 128 is in a fluid communication with the cleaner vessel 100 through a third pipeline 130 and then the central conduit 132. The sodium hydroxide solution assists in removing such alien matters as survived the triethylene glycol cleaning process. A fluid pump 134 may be employed in drawing the sodium hydroxide solution out of the reservoir 128 to deliver it to the cleaner vessel 100. Supplied into the vessel 100, the sodium hydroxide solution will be converted to a vigorous circulating stream by means of the stream generator 104. This facilitates removal of the alien matters from the filter assembly 102. Upon completion of the cleaning operation, the sodium hydroxide solution is either drained to the outside through the central conduit 132 and then a second drainpipe 135, or returned to the reservoir 128 through the central conduit 132, the third pipeline 130 and then a by-pass line 136. The exact choice between draining and returning of the used sodium hydroxide solution is largely up to the degree of contamination of, that solution. To attain an enhanced cleaning effect, it is preferred that the sodium hydroxide solution should be heated to a temperature of about 90° C., for instance.

A nitric acid solution reservoir 138 is in a fluid-communication with the cleaner vessel 100 through a fourth pipeline 140 and the central conduit 132. The nitric acid solution is particularly useful in removing those foreign materials which has survived the sodium hydroxide cleaning process. A fluid pump 142 may be employed to forcedly feed the nitric acid solution from the reservoir 138 to the cleaner vessel 100 wherein the nitric acid solution will be converted to a vigorous circulating stream by means of the stream generator 104. At the termination of such cleaning operation, the nitric acid solution is either drained to the outside through the central conduit 132 and the second drainpipe 135, or returned to the reservoir 138 through the central conduit 132, the fourth pipeline 140 and a by-pass line 144. Determination of whether the nitric acid solution is to be drained or returned depends on the degree of contamination of that solution. It is desirable to maintain the nitric acid solution at the ambient temperature.

A water tank 146 communicates with the cleaner vessel 100 through a fifth pipeline 148 and then branch pipes 150 and 152. Each time when the triethylene glycol cleaning, the sodium hydroxide cleaning or the nitric acid cleaning is over, the water under pressure will be fed into the cleaner vessel 100 by a water pump 154 to wash out residual chemical agents left in the cleaner vessel 100. To ensure an increased cleaning effect, it is desirable to preheat the water up to a temperature of about 90° C. As will be described below in more detail, the water is introduced through an axial flow path of the filter assembly 102 into the cleaner vessel 100 and, subsequently, drained to the outside through the central conduit 132 and the second drainpipe 135. Supplying the water in such a manner will ensure an easier removal of the residual chemical agents, alien matters or particles from the filter assembly. During the water washing process, the stream generator 104 does not operate at all, thus creating no water stream.

The nitrogen tank 126 is connected, on one hand, to the branch pipes 150 and 152 through first and second supply lines 156 and 158; and, one the other hand, to the branch line 124 through third supply line 160. In the process of sodium hydroxide cleaning and nitric acid cleaning, nitrogen gas is admitted into the cleaner vessel 100 through the supply lines 156 and 158 to generate nitrogen bubbles. This is referred to as "bubbling" which aids in enhancing the cleaning effect of the filter assembly 102. Additionally or alternatively, the nitrogen gas may be supplied into the cleaner vessel 100 through the supply lines 156 and 158 and the axial flow path of the filter assembly 102, immediately after the sodium hydroxide solution or the nitric acid solution has been drained from the cleaner vessel 100. This is referred to as "flushing" which assists in removing the residual sodium hydroxide or nitric acid. Moreover, the nitrogen gas may be employed to accelerate the speed at which the chemical detergent liquids are drained from the cleaner vessel 100. In other words, as the triethylene glycol solution, the sodium hydroxide solution or the nitric acid solution begins to drain from the cleaner vessel 100, the nitrogen gas may be introduced into the cleaner vessel 100 through the third supply line 160 and the second header 108 to increase the internal pressure of the vessel 100, thus ensuring a speedy draining of the chemical detergent liquids.

It should be appreciated that the cleaner vessel 100 is provided with a heating device and a cooling device. The heating device consists of a coil-shaped or helical heating pipe 162 disposed along the interior surface of the cleaner vessel 100 and a heat source 164 for supplying heat medium, e.g., hot oil, of an elevated temperature through the heating pipe 62. Such a heating device serves mainly to increase the temperature of the triethylene glycol solution up to 280° C., for example. In contrast, the cooling device includes a cooling pipe 166 of sinuous configuration affixed in the vicinity of the bottom of the cleaner vessel 100 and a coolant source 168 for feeding coolant, e.g., cold water, through the cooling pipe 166. Such a cooling device functions; to reduce the temperature of the triethylene glycol prior to its draining to the outside.

The filter assembly cleaning apparatus of the construction set forth above is adapted to operate in accordance with a predetermined control sequence, which operation may be controlled by a known programmable controller.

Figure 2:
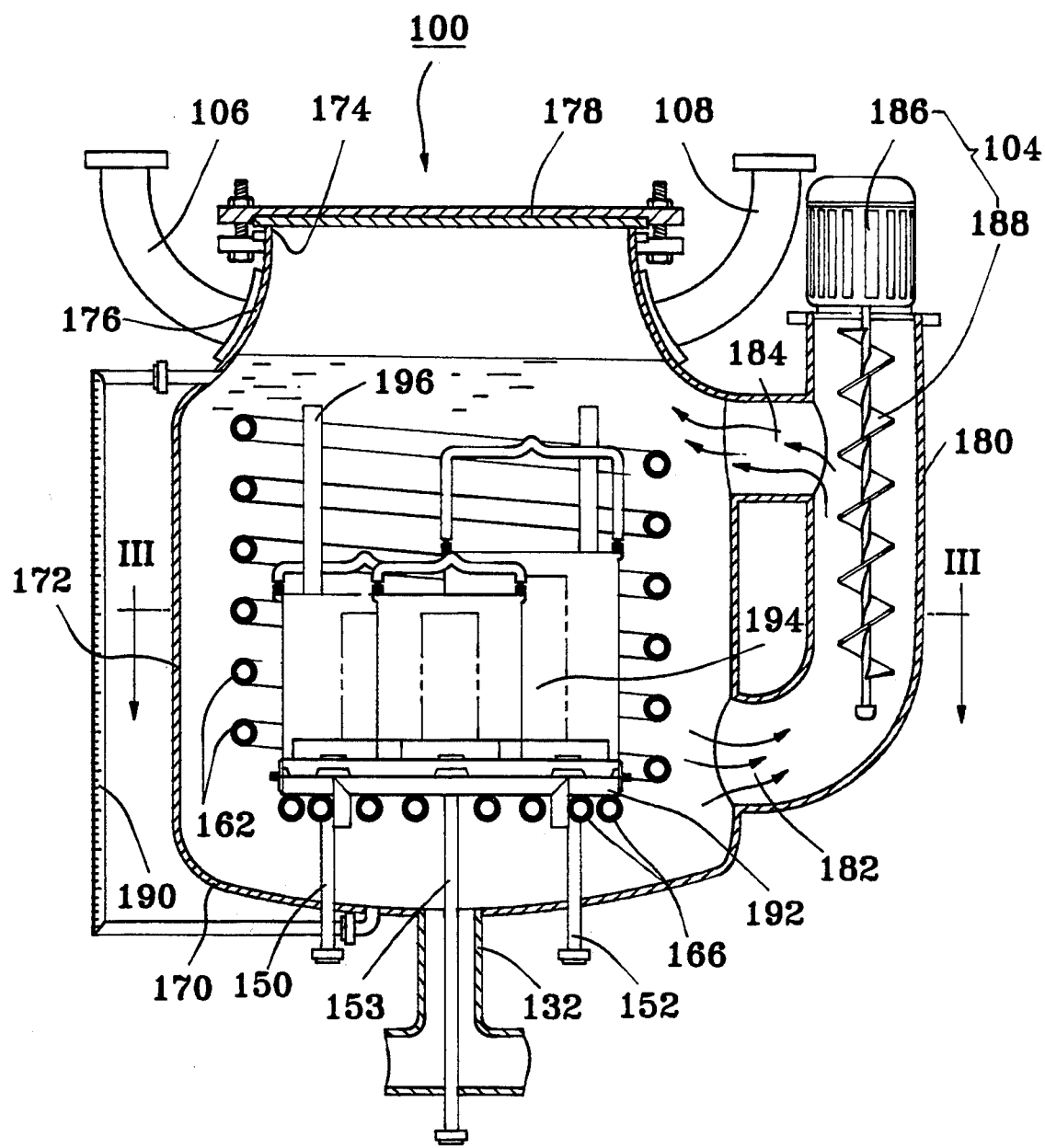
FIG. 2 is an enlarged cross-sectional view of the cleaner vessel which contains therein three filter carrying baskets.
Figure 3:
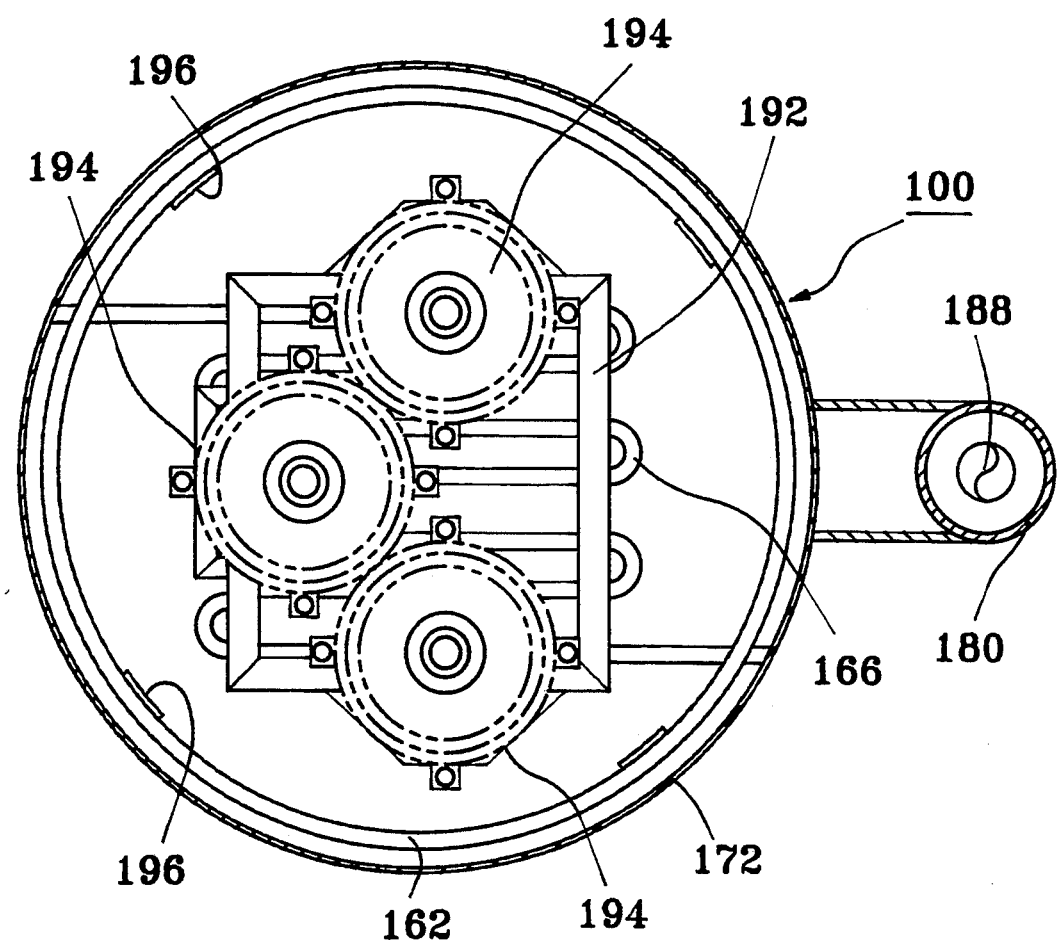
FIG. 3 is a cross-sectional view taken along line III—III in FIG. 2.

Referring now to FIGS. 2 and 3, there is shown a preferred embodiment of the cleaner vessel 100 that has a cleaning chamber enough in capacity to receive, e.g., about 2,000 litters of the chemical detergent liquids. As shown, the cleaner vessel 100 comprises a bottom wall 170 of an inverted arch shape, a cylindrical side wall 172 extending upward from the bottom wall 170 and a tapering neck 176 forming a further extension of the side wall 172. The neck 176 terminates at an access opening 174 which may be openably covered by a cover plate 178. In addition, integrally formed with the side wall 172 is a lateral casing 180 that communicates with the cleaning chamber of the cleaner vessel 100 through a lower inlet port 182 and an upper outlet port 184. The stream generator 104 is mounted on the lateral casing 180. In a preferred embodiment, the stream generator 104 includes an electric motor 186 fixedly attached on the top of the casing 180 and an impeller 188 projecting into the casing 180 from the electric motor 186. The impeller 188 is operatively connected to the motor 186 such that, when driven by the motor 186, the impeller 188 can forcedly circulate the chemical detergent liquids contained within the cleaning chamber in the direction as indicated by arrows, thereby generating a vigorous stream of the chemical detergent liquids.

As set forth hereinabove, the first header 106 and the second header 108 are connected to the neck 176 off the cleaner vessel 100 in the form of a mirror image with respect to one another. The first header 106 serves as a fluid passageway through which the triethylene glycol solution reservoir 112 communicates with the cleaner vessel 100. Provision of the second header 108 is either to release therethrough such gases as created in the cleaning process or to introduce nitrogen gas into the cleaner vessel 100. Coupled to the bottom wall 170 of the cleaner vessel 100 is the central conduit 132 that functions, on one hand, as a supply path for feeding the sodium hydroxide solution or the nitric acid solution to the cleaner vessel 100 and, on the other hand, as a drain path for discharging the triethylene glycol solution, the sodium hydroxide solution, the nitric acid solution or the water from the cleaner vessel 100. A level indicator 190 may be connected to the cleaner vessel 100 so as to enable the operator to visually observe the level of the liquids contained in the cleaner vessel 100.

Within the cleaner vessel 100 and adjacent to the bottom wall 170 thereof, a platform 192 is located to stably support filter carrying baskets 194 which will be described below in more detail. Although the platform 192 shown in FIGS. 2 and 3 is constructed to support three of such baskets 194 at a time, it would be possible to modify the configuration of the platform 192 so that greater or fewer baskets can be supported by the platform 192. The branch pipes 150, 152 and 153 that correspond to each of the baskets 194 are directly connected to the platform 192. It can be seen in FIG. 1 that the branch pipes 150, 152 and 153 lead to the water tank 146 via the pipeline 148. Along the interior surface of the side wall 172, the helical heating pipe 162 is held in position by means of a rigid beam 196 in order to heat, e.g., a triethylene glycol solution up to the temperature of about 280° C. On the underlying surface of the platform 192, the cooling pipe 166 is disposed in a sinuous pattern for the purpose of cooling down the heated triethylene glycol solution to a permissible temperature before it is drained to the outside.

Figure 4:
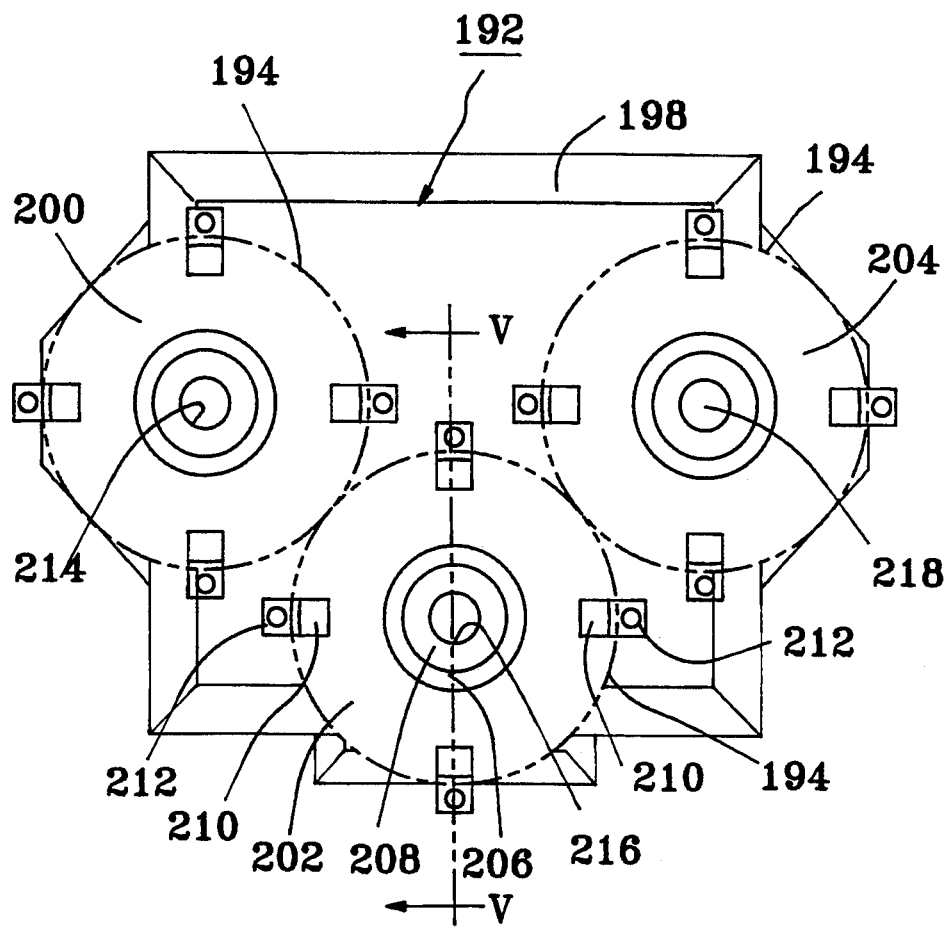
FIG. 4 is a top view of the platform mounted adjacent to the bottom of the cleaner vessel to support the filter carrying basket.

As shown in FIG. 4, the platform 192 includes a base frame 198 and first to third bearing seats 200, 202 and 204 on which the filter carrying baskets may be placed. It is apparent from FIG. 5 that each of the bearing seats 200, 202 and 204 has a central boss 208 with a tapering lateral surface 206 and at least two wedge-like diametrically disposed rim segments 212 with an inwardly downwardly slanted surface 210. As will be explained below, each of the filter carrying baskets 194 has an underlying surface generally complementary to the bearing seat 200, 202 and 204. For this reason, there is no likelihood of misalignment between the specific basket and the corresponding bearing seat, even when the basket is landed on the bearing seat in a somewhat misaligned condition. The central bosses 208 constituting each of the bearing seats 200, 202 and 204 have through-holes 214, 216 and 218 with which are threadedly engaged the branch pipes 150, 152 and 153.

Figure 6:
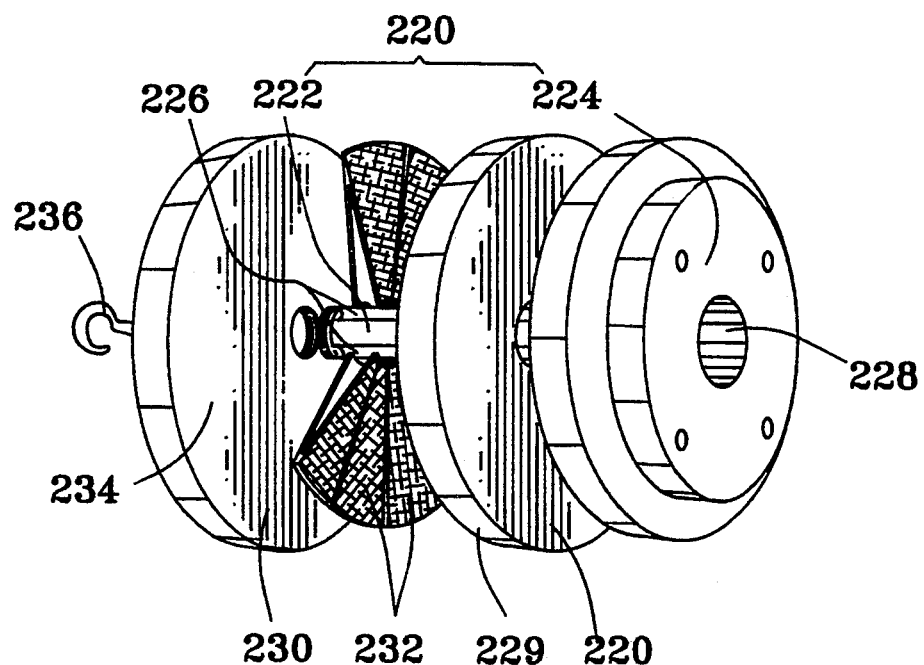
FIG. 6 is a partially cutaway, exploded perspective view of the typical filter assembly that may be cleaned by means of the inventive cleaning apparatus.
Figure 7:
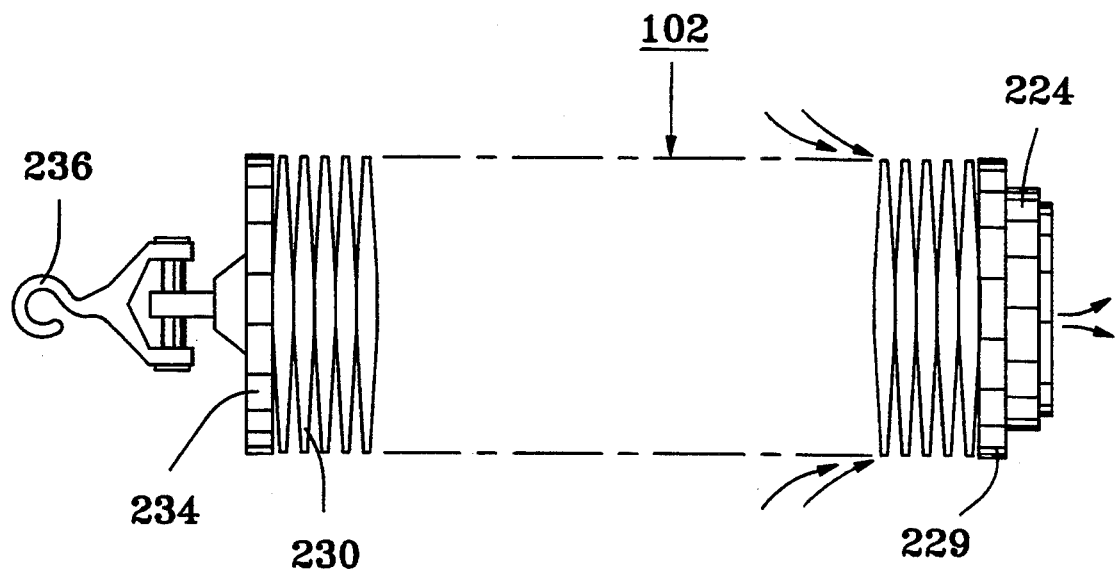
FIG. 7 is a front view of the filter assembly with a plurality of porous filter elements stacked along the length thereof.

Referring to FIGS. 6 and 7, there is shown a typical filter assembly 102 which may be cleaned by the cleaning apparatus in accordance with the invention. As shown, the filter assembly 102 comprises an elongate stem 220 which, in turn, is formed with a shaft portion 222 and a head portion 224. The shaft portion 222 has a plurality of axial grooves 226 extending along the length thereof, while the head portion 224 is provided with an end aperture 228 leading to the axial grooves 226 of the shaft portion 222. It should be understood that the axial grooves 225 cooperate with the end aperture 228 to define an axial flow path of the filter assembly 102. A disk-like spacer 229 is slidingly combined along the shaft portion 222 of the stem 220. The filter assembly 102 further comprises a plurality of porous filter elements 230 which are stacked one above the other along the shaft portion 222. Each of the filter elements 230 has fine perforations 232, on its major surfaces, that will stop any contaminants or alien matters present in the molten polymer while allowing the molten polymer to flow therethrough toward the axial flow path of the filter assembly 102. A cover plate 234 is placed on the lastly stacked filter element to complete the filter assembly 102, which cover plate has a hook 236 pivotably attached thereto.

Figure 5:
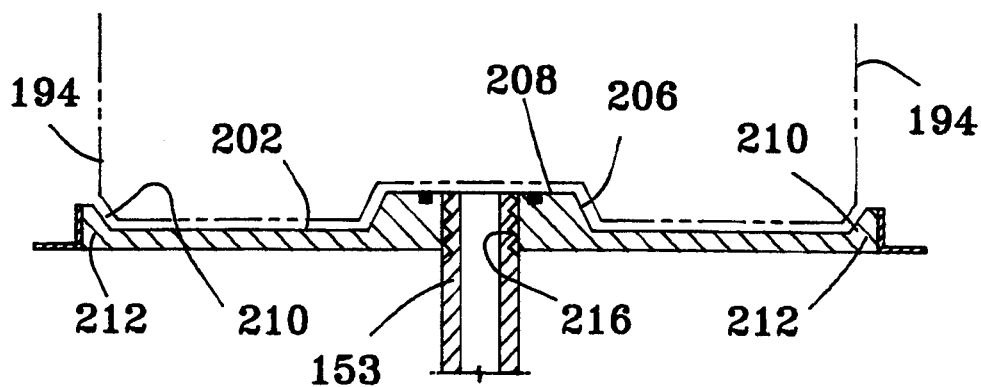
FIG. 5 is a cross-sectional view taken along line V—V in FIG. 4.
Figure 8:
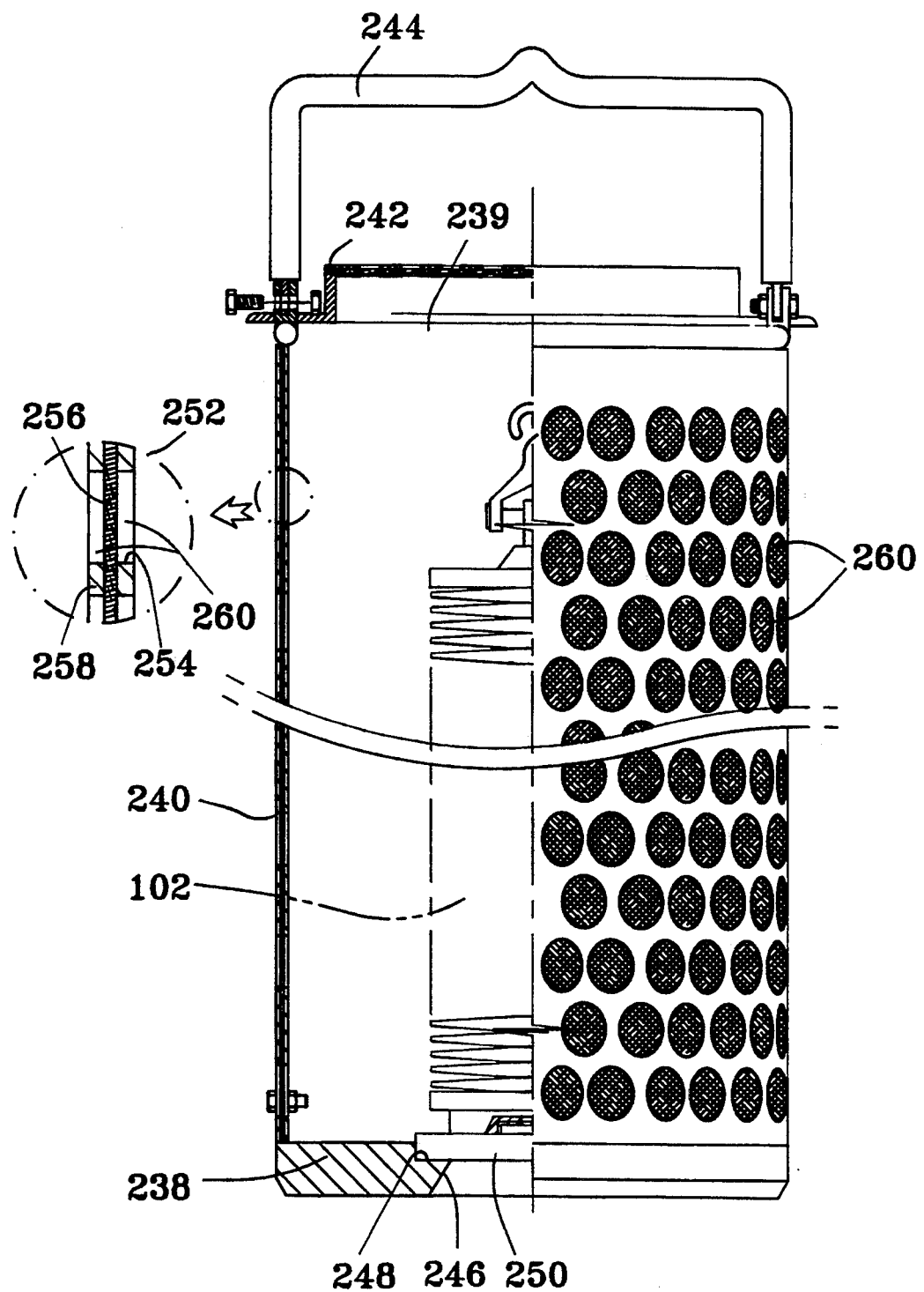
FIG. 8 is a partially cutaway, front elevational view the filter carrying basket whose side wall consists of three different layers as microscopically depicted within a circle on an enlarged scale.

Referring to FIG. 8, there is shown, by way of example, a preferred filter carrying basket 194 which comprises a bottom plate 238, a generally cylindrical side wall 240 extending upward from the bottom plate 238 and terminating at a top opening 239, a lid 242 covering the top opening 239 of the side wall 240 and a lift bar 244 pivotably mounted on the top edge of the side wall 240 to extend transversely over the top opening 239. The bottom plate 238 has an underlying surface which is complementary to the bearing seat of the platform 192, as best shown in FIG. 5. Furthermore, the bottom plate 238 is formed with a tapering bore 246 and a recess 248 adjoining the bore 246. Seated in the recess 248 is a spacer block 250 on which the filter assembly 102 is placed in an end-to-end relationship. The spacer block 250 will be described later with reference to FIGS. 11 and 12.

As depicted microscopically within a circle 252 in FIG. 8, the side wall 240 of the basket 194 consists of an inner rigid layer 254, an intermediate mesh layer 256 and an outer rigid layer 258. Through the thickness of the inner and the outer rigid layers 254 and 258, a multiple number of fluid communication holes 260 are formed to allow the chemical detergent liquids to flow into or out of the basket 194. The intermediate mesh layer 256 serves to prevent solid matters or particles from escaping out of the basket 194, which would otherwise cause a trouble in the cleaning apparatus.

Figure 9:
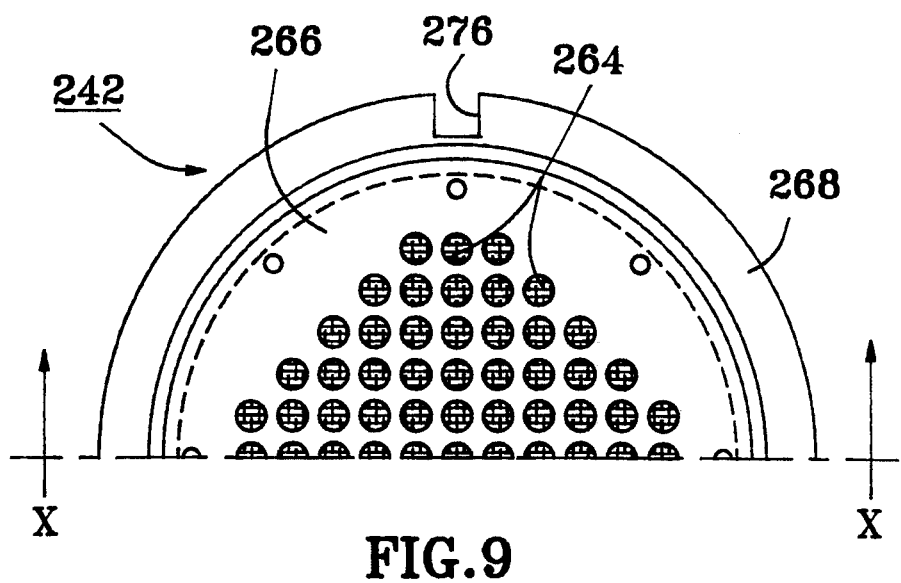
FIG. 9 is a top plan view showing the lid removably attached on the top of the filter carrying basket.
Figure 10:
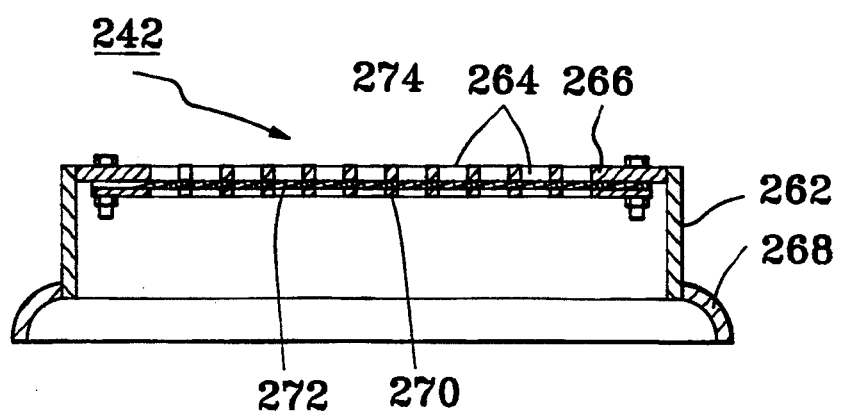
FIG. 10 is a cross-sectional view taken along line X—X in FIG. 9.

Turning to FIGS. 9 and 10, the silk hat-shaped lid 242 of the filter carrying basket 194 has a cylindrical flank wall 262, a top wall 266 and a flange 268 extending radially outwardly from the lower edge of the flank wall 262. As with the side wall 240 of the basket 194, the top wall 266 consists of an inner rigid layer 270, an intermediate mesh layer 272 and an outer rigid layer 274. The inner and the outer rigid layers 270 and 274 are provided with a number of fluid communication holes 264. The flange 268 of the lid 242 has a couple of cutouts 276 that will permit the lift bar 244 (see FIG. 8) to be mounted on the edge of the side wall. 240 of the basket 194.

Figure 11:
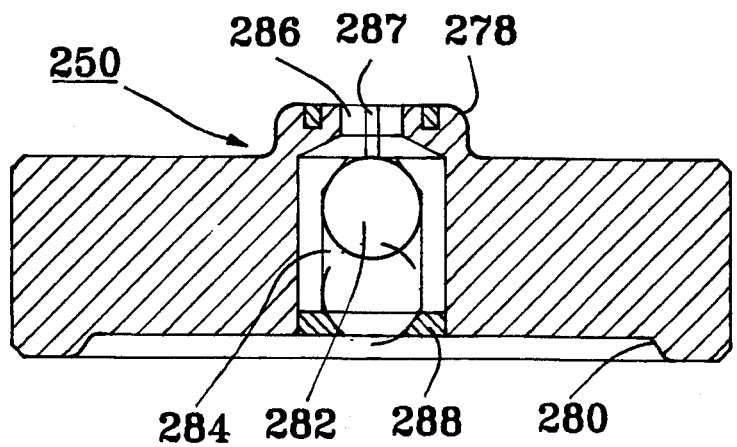
FIG. 11 is a cross-sectional view of the spacer normally located between the bottom of the filter carrying basket and the underlying surface of the filter assembly.
Figure 12:
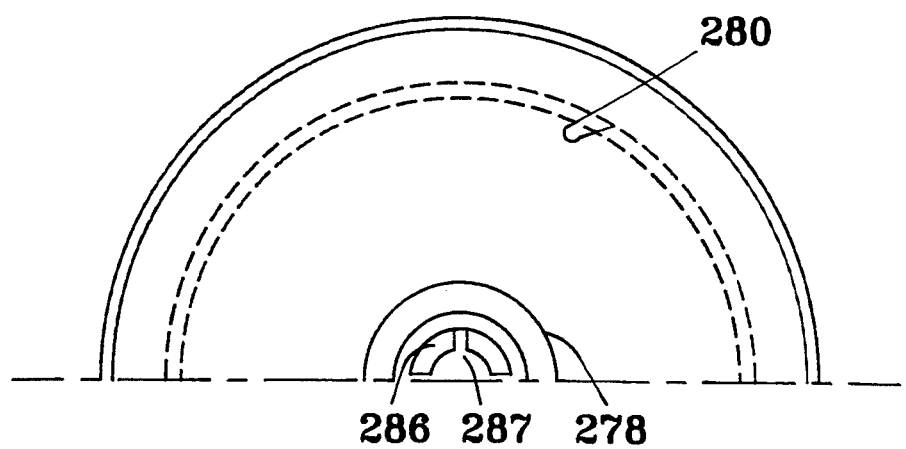
FIG. 12 is a top plan view of the spacer shown in FIG. 11.
Figure 13:
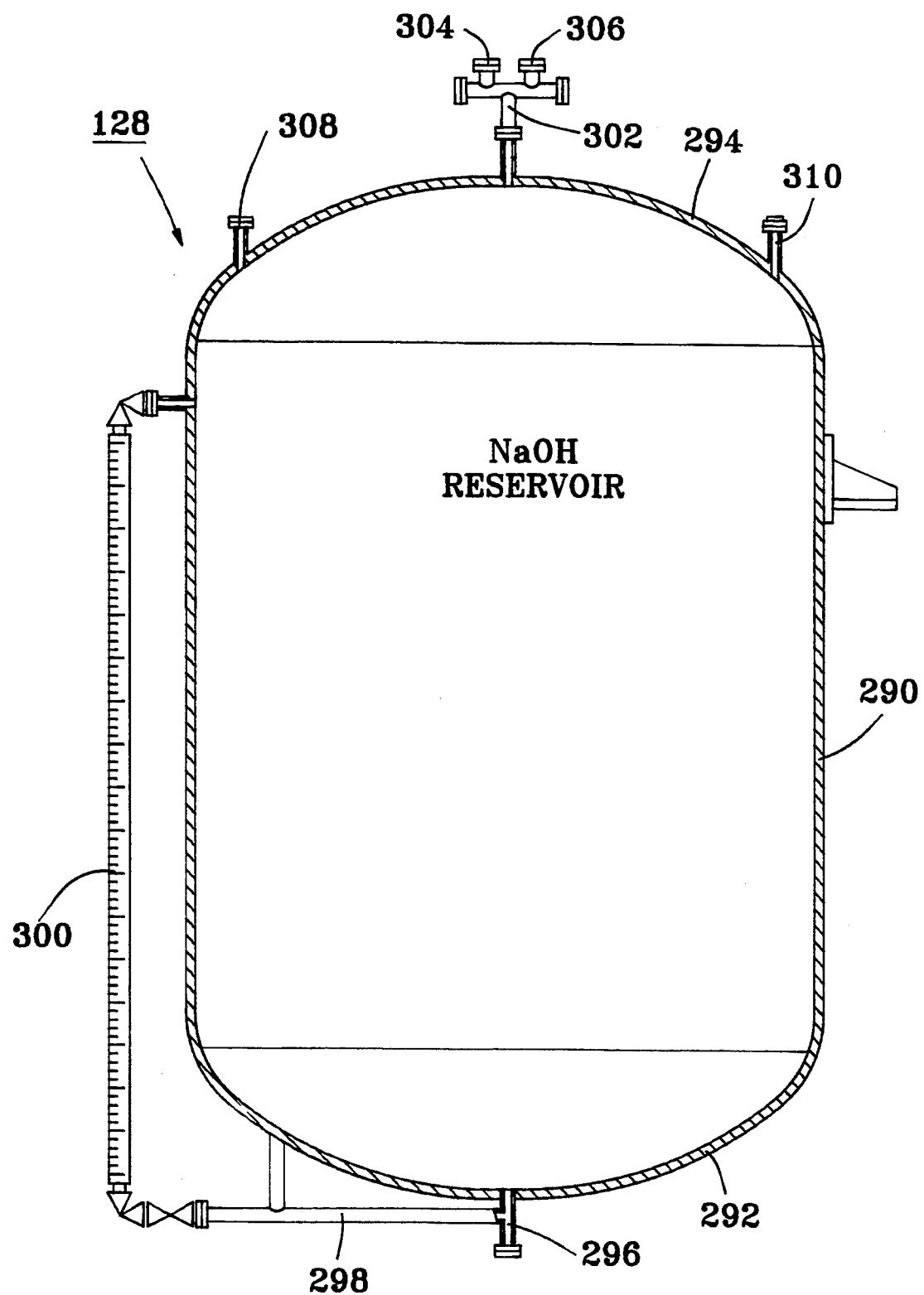
FIG. 13 is a longitudinal cross-section of the sodium hydroxide solution reservoir constituting an element of the inventive cleaning apparatus.

Referring to FIGS. 11 and 12, there is shown a preferred spacer block 250 adapted to be held in place between the filter assembly 102 and the bottom plate 238 of the basket 194. As shown, the spacer block 290 includes a raised region 278 coming into engagement with the end aperture 228 of the filter assembly 102, an underlying recess 280 receiving a top portion of the central boss 208 of the platform 192, a central channel 284 formed through the thickness of the spacer block 250, an upper stopper 286 having a crisscross slot 287, a lower stopper 288 spaced apart from the upper stopper 286 and a ball checker 282 trapped within the central channel 284 for movement between an upper position-(indicated by a solid line) in which the water is allowed to pass through the central channel 284 and a lower position(indicated by a phantom line) in which the central channel 284 is completely clogged by the ball checker 282. During the process of chemical cleaning, the ball checker 282 is kept in the lower position to prevent any solid particles from escaping through the central channel 284 out of the cleaner vessel 100.

Referring to FIG. 12, the sodium hydroxide solution reservoir 128 comprises a cylindrical side wall 290, an inverted arch-shaped bottom wall 292 and an arch-shaped top wall 294. At the center of the bottom wall 292, there is provided a drainpipe 296 which may feed therethrough the sodium hydroxide solution to the cleaner vessel 100 and which communicates with a level indicator 300 through a horizontal pipe 298. At the center of the top wall 294, there is provided a supply pipe 302 which has a water inlet port 304 and a sodium hydroxide inlet port 306. Also secured to the top wall 294 are a vent pipe 308 and a vacuum prevention pipe 310.

Figure 14:
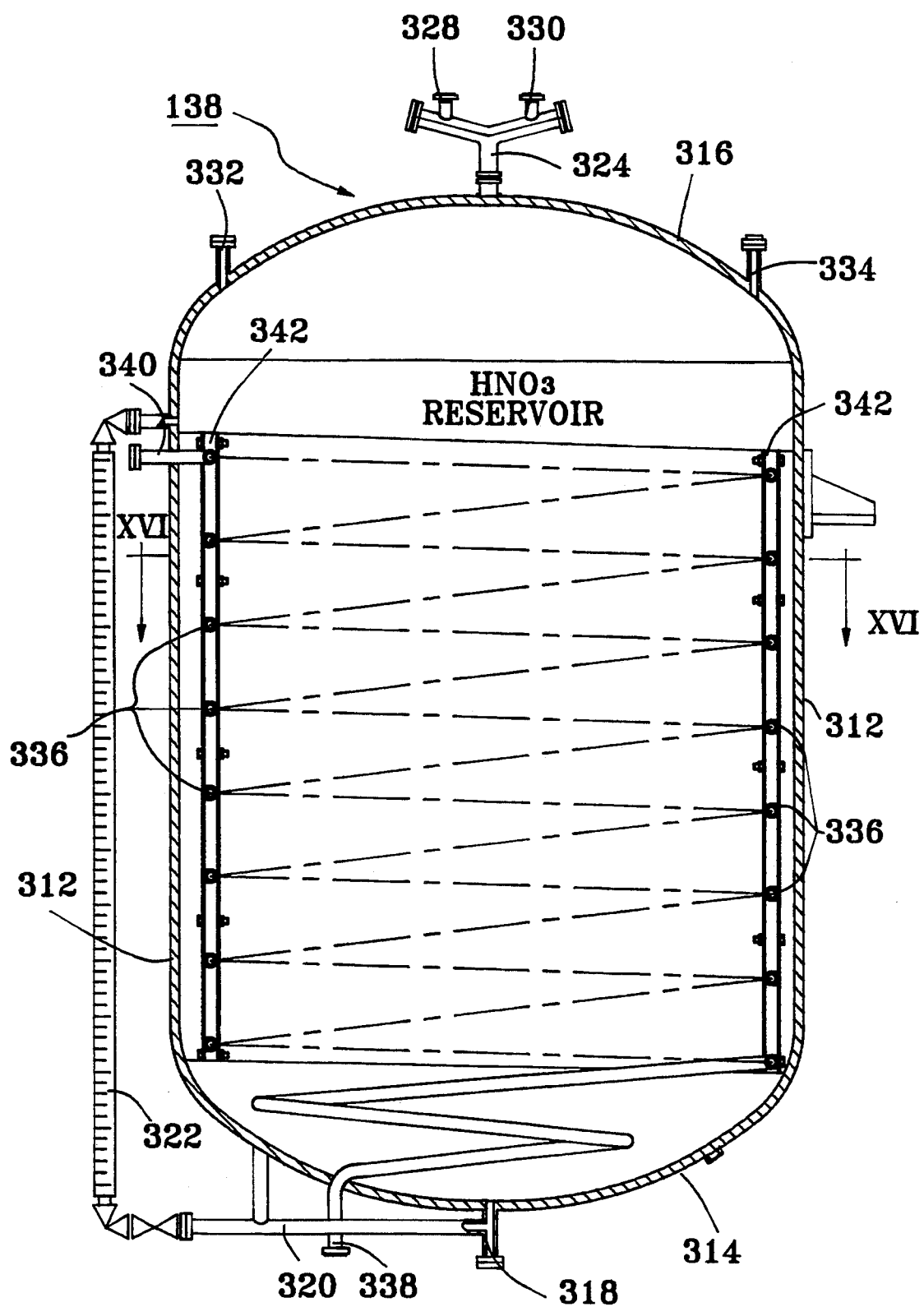
FIG. 14 is a view similar to FIG. 13 but showing the nitric acid solution reservoir employed in the inventive cleaning apparatus.

As best shown in FIG. 14, the nitric acid solution reservoir 138 has a cylindrical side wall 312, an inverted arch-shaped bottom wall 314 and an arch-shaped top wall 316. At the center of the bottom wall 314, there is provided a drainpipe 318 which may feed therethrough the nitric acid solution to the cleaner vessel 100 and which communicates with a level indicator 322 through a horizontal pipe 320. At the center of the top wall 316, there is provided a supply pipe 324 which has a water inlet port 328 and a nitric acid inlet port 330. Also secured to the top wall 316 are a vent pipe 332 and a vacuum prevention pipe 334. Unlike the sodium hydroxide solution reservoir 128, the nitric acid solution reservoir 138 further includes a helical cooling pipe 336 disposed adjacent to the interior surface of the side wall 312. The cooling pipe 336 has an inlet port 338 projecting from the bottom wall 314 and an outlet port 340 projecting from the side wall 312. Thus, the nitric acid solution may be cooled down to the ambient temperature by way of circulating the coolant through the cooling pipe 336.

Figures 15, 16:
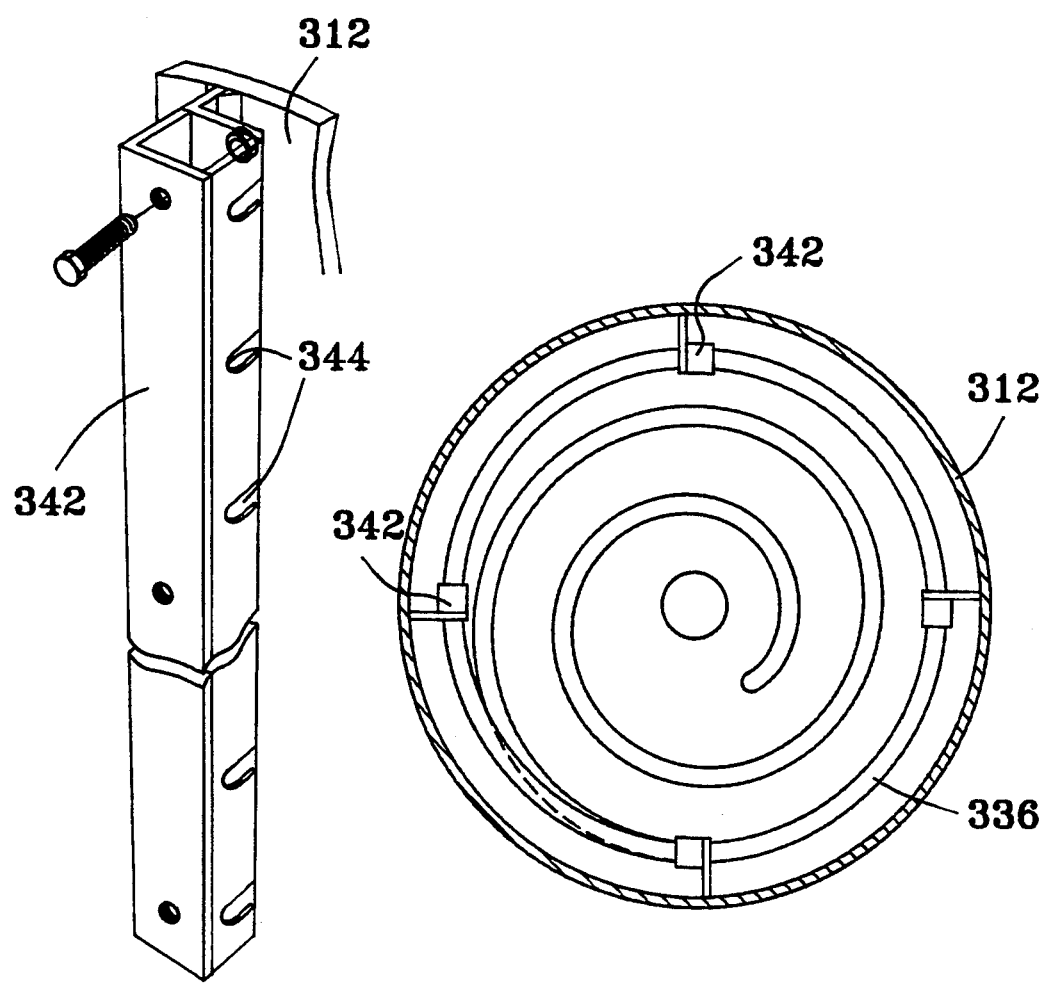
FIG. 15 is a perspective view of the support beam fixedly mounted within the nitric acid solution reservoir to support the cooling pipe in a helical pattern.
FIG. 16 is a cross-sectional view taken along line XVI—XVI in FIG. 14.

In FIGS. 15 and 16, support beams 342 are employed to hold the cooling pipe 336 in position within the nitric acid solution reservoir 138. The support beams 342 may be affixed to the side wall 312 of the reservoir 138 by any suitable means such as a welding or a bolt/nut fastener. Along the length of the support beams 342, several slots 344 are formed at a substantially uniform interval so that each convolution of the cooling pipe 336 can be inserted therethrough as clearly shown in FIG. 14. Although four of the support beams 342 are shown in FIG. 16, the exact number of the support beams 342 can be greater or fewer depending on the particular design of the nitric acid solution reservoir 138.

Figure 17:
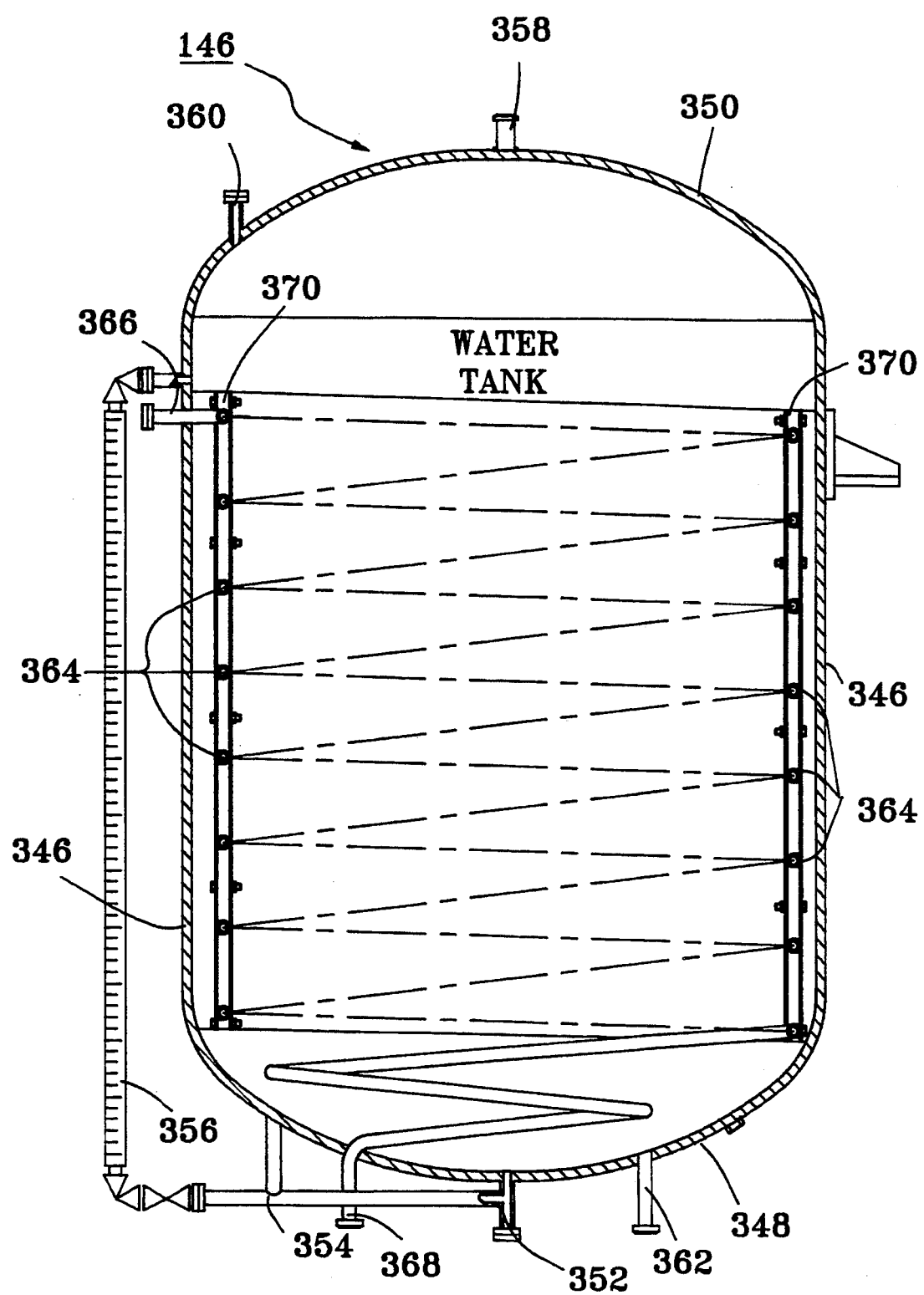
FIG. 17 is a longitudinal cross-section of the water reservoir employed in the inventive cleaning apparatus.

Referring to FIG. 17, the water tank 146 comprises a cylindrical side wall 346, an inverted arch-shaped bottom wall 348 and an arch-shaped top wall 350. At the center of the bottom wall 348, there is provided a drainpipe 352 which may feed therethrough the water to the cleaner vessel 100. The drainpipe 352 communicates with the level indicator 356 through an horizontal pipe 354. A water supply pipe 358 is connected to the center of the top wall 350 with a vent pipe 360 secured adjacent to the water supply pipe 358 on the top wall 350. In the vicinity of the drainpipe 352, a temperature detection pipe 362 is secured to the bottom wall 348. Moreover, the water tank 146 further comprises a helical heating pipe 364 disposed adjacent to the interior surface of the side wall 346. The heating pipe 364 has an inlet port 366 projecting from the side 346 and an outlet port 368 projecting from the bottom wall 348. Accordingly, the water contained in the water tank 146 may be heated to a temperature of, e.g., 90° C. by way of circulating the heating medium through the helical heating pipe 364. As illustrated in FIG. 17, the heating pipe 364 is held in position by means of support beams 370. The foregoing description on the support beams 342 made in conjunction with FIGS. 15 and 16 holds true for the support beams 370 shown in FIG. 17.

In the following, description will be made on how to carry out the cleaning method in accordance with the invention.

The inventive cleaning method may be advantageously employed in cleaning the used filter assembly with chemical agents in a single cleaner vessel. As a matter of basic concept, the filter assembly cleaning method comprises the steps of: (a) placing the filter assembly into the cleaner vessel; (b) cleaning the filter assembly with triethylene glycol solution at an elevated temperature while circulating the triethylene glycol solution within the cleaner vessel; (c) upon draining the triethylene glycol solution from the cleaner vessel, feeding water under pressure through the axial flow path of the filter assembly into the vessel to remove residual triethylene glycol solution; (d) cleaning the filter assembly with sodium hydroxide solution while circulating the sodium hydroxide solution within the cleaner vessel; (e) upon draining the sodium hydroxide solution from the cleaner vessel, feeding the water under pressure through the axial flow path of the filter assembly into the vessel to remove residual sodium hydroxide solution; (f) cleaning the filter assembly with nitric acid solution while circulating the nitric acid solution within the cleaner vessel; and (g) upon draining the nitric acid solution from the cleaner vessel, feeding the water under pressure through the axial flow path of the filter assembly into the vessel to remove residual nitric acid solution.

It is desirable that the triethylene glycol cleaning step and the water washing step should be repeated once more after step(c) has been completed. The triethylene glycol cleaning step is preferably performed at a temperature of from 275° C. to 285° C. to attain a maximized cleaning effect. The sodium hydroxide cleaning step may be carried out once more, followed by another water washing step, when step(e) has been over. Likewise, the nitric acid cleaning step may be repeated once more together with the water washing step, at the termination of step(g). If desired, nitrogen gas under pressure may be admitted into the cleaner vessel, while performing steps(d) and (f).

Figure 18:
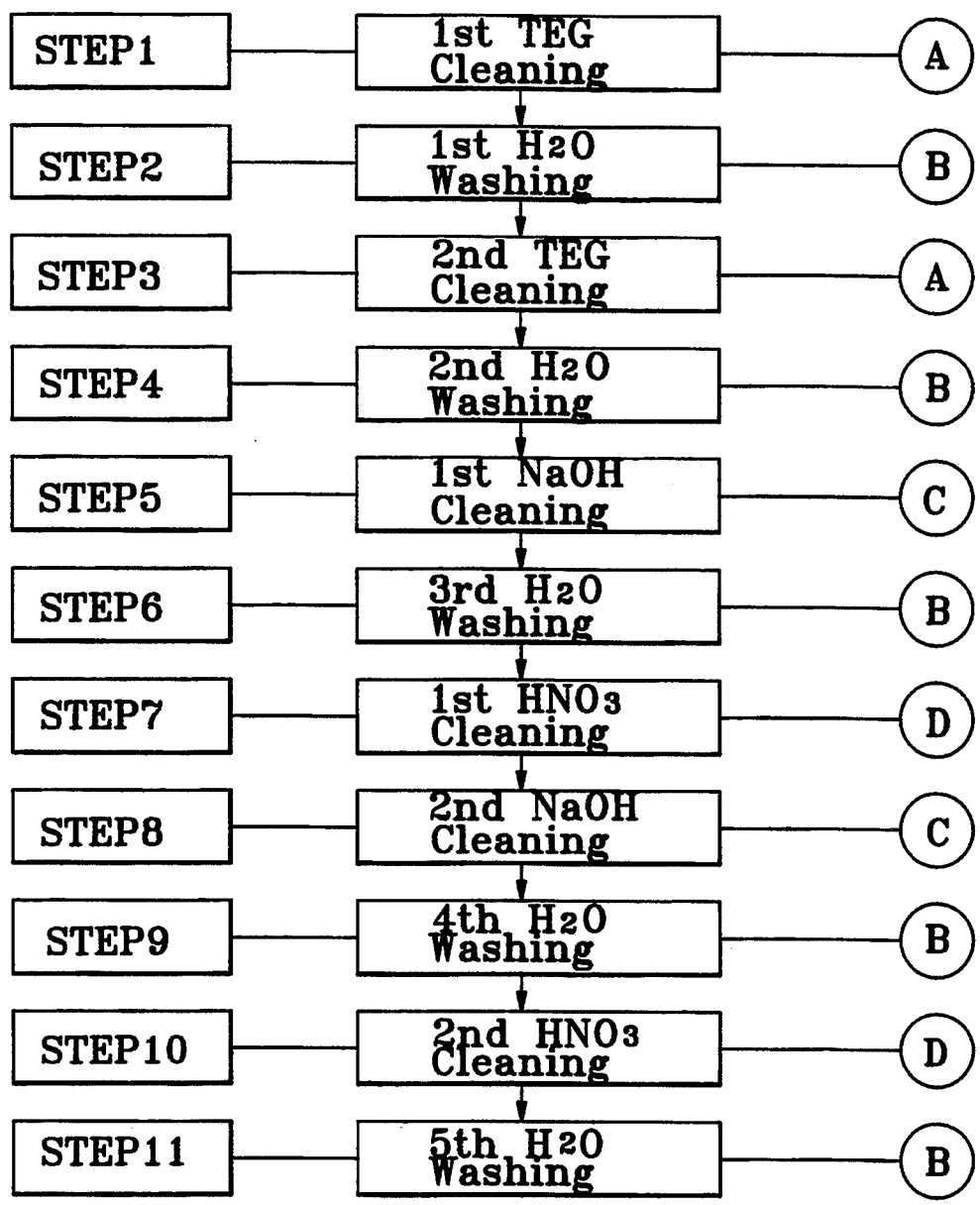
FIG. 18 illustrates various steps for carrying out the cleaning process in,accordance with the invention.

Referring to FIG. 18, there is schematically shown a cleaning method in accordance with the particularly preferred embodiment of the invention. As shown, the cleaning method comprises eleven steps wherein four sorts of cleaning or washing operations labelled by A, B, C and D are carried out at the predetermined number of times under the control of a programmable controller.

In Step 1, the used filter assemblies are placed within the cleaner vessel through the use of a conventional lifting device. The cleaner vessel in then filled with the triethylene glycol solution(TEG) of about 2,000 litters which, in turn, is heated to a temperature of 280° C. by a heating device. The triethylene glycol cleaning is carried out for a time period of about 6 hours during which the triethylene glycol solution continues to circulate, as a vigorous stream, within the cleaner vessel. At the completion of the triethylene glycol cleaning, the waste solution is cooled down to a temperature of 100° C. or less and drained to the outside.

In Step 2, the water($H_2O$) under pressure is fed into the cleaner vessel through the axial flow path of the individual filter assembly to wash out residual triethylene glycol left in the cleaner vessel. To ensure an increased washing effect, it is desirable to use pure water preheated to a temperature of about 90° C. The time required in the water washing step is in the order of 25 minutes.

In Steps 3 and 4, the triethylene glycol cleaning and the water washing are performed once more in the same manner as explained above. These steps are optional and, therefore, may be omitted from the cleaning process.

In Step 5, the cleaner vessel is filled with the sodium hydroxide solution(NaOH) at a temperature of about 95° C. The sodium hydroxide cleaning is performed for a time period of 3 hours by way of forcedly circulating the sodium hydroxide solution within the cleaner vessel. Nitrogen gas may be fed into the cleaner vessel to promote the cleaning action of the sodium hydroxide solution. At the end of Step 5, the sodium hydroxide solution is drained out of the cleaner vessel. In case where the waste sodium hydroxide solution is not heavily contaminated, it may be returned to the sodium hydroxide reservoir for reuse in the later step or another cleaning process.

In Step 6, the water washing is carried out in the same manner as in Step 2 to wash out residual sodium hydroxide left in the cleaner vessel.

In Step 7, the cleaner vessel is filled with the nitric acid solution($HNO_3$) at the ambient temperature. The nitric acid cleaning is performed for a time period of 30 minutes by way of forcedly circulating the nitric acid solution within the cleaner vessel. As in Step 5, nitrogen gas may be fed into the cleaner vessel to promote the cleaning action of the nitric acid solution. At the termination of Step 7, the nitric acid solution may be either drained to the outside or returned to the nitric acid reservoir for reuse in the later step.

In Steps 8 and 9, the sodium hydroxide cleaning and the water washing are repeated once more in the same manner as Steps 5 and 6.

Finally, in Steps 10 and 11, the nitric acid cleaning and the water washing is performed once more in the same manner as stated above to complete the overall cleaning process. It should be understood that Steps 8 to 11 are optional and, therefore, omitted from the cleaning process.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for use in cleaning a filter assembly with chemical agents, the filter assembly including an elongate stem and a plurality of porous filter elements stacked one above the other along an axis of the stem, the stem having an axial flow path extending from an end aperture to the filter elements, comprising:

a cleaner vessel for accommodating the filter assembly to clean the latter with a variety of chemical detergents, the cleaner vessel including a platform fixedly mounted in the vicinity of the bottom of the cleaner vessel, the platform having at least one bearing seat adapted to support the filter assembly in a stable manner;

a plurality of reservoirs each communicating with the cleaner vessel and holding therein the chemical detergents which are to be fed into the cleaner vessel;

a water tank communicating with the cleaner vessel and holding water therein, the water tank coupled to the end aperture of the filter assembly to allow the water to flow through the axial flow path into the cleaner vessel;

means for causing the chemical detergents to circulate within the cleaner vessel;

means for controlling the operation of the filter assembly cleaning apparatus; and a filter carrying basket for containment of the filter assembly, the basket including a base plate with an underlying surface complementary to the bearing seat of the platform, a cylindrical side wall extending upward from the base plate and terminating at a top opening, an openable lid attached to the top opening of the side wall and a lift bar pivotably mounted on the side wall to extend transversely over the top opening, the side wall having a multiplicity of uniformly distributed fluid communication holes and a mesh layer for covering the fluid communication holes to prevent any discharge of solid particles from the basket.

2. The apparatus as recited in claim 1, wherein the plurality of reservoirs include a triethylene glycol solution reservoir communicating with the cleaner vessel through a first pipeline, a sodium hydroxide solution reservoir communicating with the cleaner vessel through a second pipeline and a nitric acid solution reservoir communicating with the cleaner vessel through a third pipeline.

3. The apparatus as recited in claim 2, further comprising means mounted to the cleaner vessel for heating the triethylene glycol solution to a temperature ranging from 275° C. to 285° C.

4. The apparatus as recited in claim 3, wherein the heating means includes a beating pipe arranged in a helical pattern along an interior surface of the cleaner vessel and a heat source for supplying a heating medium through the heating pipe.

5. The apparatus as recited in claim 3, further comprising means for cooling the triethylene glycol solution to a temperature of about 100° C. at the termination of the triethylene glycol cleaning.

6. The apparatus as recited in claim 5, wherein the cooling means includes cooling pipe arranged in a sinuous pattern adjacent to the bottom of the cleaner vessel and a coolant source for supplying a cooling medium through the cooling pipe.

7. The apparatus as recited in claim 2, further comprising means for forcing nitrogen gas into the cleaner vessel to generate nitrogen bubbles in the sodium hydroxide solution and the nitric acid solution.

8. The apparatus as recited in claim 2, further comprising a beat exchanger disposed midway of the first pipeline for preheating the triethylene glycol solution as it is being supplied through the first pipeline into the cleaner vessel.

9. The apparatus as recited in claim 1 wherein the means for causing the chemical detergents to circulate includes a lateral casing communicating with the cleaner vessel through a lower inlet port and an upper outlet port, an electric motor to cause circulation of the chemical detergents within the cleaner vessel when the motor is activated.

10. The apparatus as recited in claim 1, wherein the basket further includes a spacer block located between the filter assembly and the base plate of the basket, the spacer block having a central channel formed through the thickness thereof and a ball checker trapped within the central channel for movement between an upper position in which the water is allowed to pass through the central channel and a lower position in which the central channel is completely clogged by the ball checker.

* * * * *